United States Patent
Miller et al.

(10) Patent No.: US 10,397,478 B2
(45) Date of Patent: Aug. 27, 2019

(54) BEARING LIMITER STRUCTURES IN OPTICAL IMAGE STABILIZATION SUSPENSIONS

(71) Applicant: Hutchinson Technology Incorporated, Hutchinson, MN (US)

(72) Inventors: Mark A. Miller, Hutchinson, MN (US); Richard R. Jenneke, Hutchinson, MN (US); Donald M. Anderson, Hutchinson, MN (US); Erich W. Bierbrauer, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 15/861,577

(22) Filed: Jan. 3, 2018

(65) Prior Publication Data
US 2018/0191957 A1    Jul. 5, 2018

Related U.S. Application Data

(60) Provisional application No. 62/442,019, filed on Jan. 4, 2017.

(51) Int. Cl.
| | | |
|---|---|---|
| *H04N 5/232* | (2006.01) | |
| *H04N 5/225* | (2006.01) | |
| *G02B 27/64* | (2006.01) | |
| *F16C 33/02* | (2006.01) | |
| *F16C 29/02* | (2006.01) | |

(52) U.S. Cl.
CPC ......... *H04N 5/23248* (2013.01); *F16C 29/02* (2013.01); *F16C 33/02* (2013.01); *G02B 27/646* (2013.01); *H04N 5/2253* (2013.01); *F16C 2208/54* (2013.01); *F16C 2370/00* (2013.01)

(58) Field of Classification Search
None
See application file for complete search history.

(56) References Cited

U.S. PATENT DOCUMENTS

| | | | |
|---|---|---|---|
| 9,175,671 | B2 | 11/2015 | Howarth |
| 9,366,879 | B1 | 6/2016 | Miller |
| 9,479,699 | B2 | 10/2016 | Brown et al. |
| 2012/0119614 | A1 | 5/2012 | Gutierrez |
| 2014/0177056 | A1 | 6/2014 | Hayashi et al. |
| 2015/0135703 | A1 | 5/2015 | Eddington et al. |

(Continued)

FOREIGN PATENT DOCUMENTS

| | | |
|---|---|---|
| WO | 2013/175197 A1 | 11/2013 |
| WO | 2014/083318 A1 | 6/2014 |

OTHER PUBLICATIONS

International Search Report and Written Opinion in International Application No. PCT/US2018/012380, dated May 1, 2018.

*Primary Examiner* — Mark T Monk
(74) *Attorney, Agent, or Firm* — Nixon Peabody LLP

(57) ABSTRACT

A suspension assembly is described. A suspension assembly including a support member; a moving member; one or more bearings; and one or more bearing limiters. The one or more bearings between the support member and the moving member to space the support member and moving member by a bearing distance about the z axis. And, the one or more bearing limiters between the first and second members to limit movement of the support member and moving member about the z axis to a gap distance that is less than the bearing distance.

19 Claims, 6 Drawing Sheets

(56) References Cited

U.S. PATENT DOCUMENTS

| | | |
|---|---|---|
| 2015/0304561 A1 | 10/2015 | Howarth et al. |
| 2015/0346507 A1 | 12/2015 | Howarth |
| 2016/0109681 A1 | 4/2016 | Lam |
| 2016/0154251 A1 | 6/2016 | Ladwig et al. |
| 2016/0170229 A1* | 6/2016 | Park .................. H04N 5/2257 359/557 |
| 2016/0259178 A1 | 9/2016 | Miller |

* cited by examiner

BEARING LIMITER STRUCTURES IN OPTICAL IMAGE STABILIZATION SUSPENSIONS

CROSS-REFERENCE TO RELATED APPLICATIONS

This application claims priority from U.S. Provisional Patent Application No. 62/442,019, filed on Jan. 4, 2017, which is hereby incorporated by reference in its entirety.

FIELD

The invention relates generally to optical image stabilization (OIS) suspensions used in connection with cameras, including those incorporated into mobile devices such as phones and tablets.

BACKGROUND

Shape memory alloy (SMA) camera lens optical image stabilization (OIS) suspensions are generally known and disclosed, for example, in the Howarth U.S. Pat. No. 9,175,671, Miller U.S. Pat. No. 9,366,879, and Brown U.S. Pat. No. 9,479,699, the Ladwig U.S. Patent Application Publication 2016/0154251, Miller U.S. Patent Application Publication 2016/0259178, Eddington U.S. Patent Application Publication 2015/0135703, and Howarth U.S. Patent Application Publication 2015/0346507, and the PCT International Application Publication Nos. WO 2014/083318 and WO 2013/175197, all of which are incorporated herein by reference in their entireties and for all purposes. Embodiments include a spring crimp circuit or moving member mounted to a flexible printed circuit (FPC) or static support member. One or more bearings between the moving member and the support member provide a gap between these components about a z axis and enable movement of the moving member with respect to the support member about x-y axes. OIS assemblies of these types have a lens and optionally an auto focus (AF) assembly or system mounted to the moving member. SMA wires couple the moving member to the support member and are controlled by a controller. The SMA wires are driven to move the moving member about the x-y axes with respect to the support member to stabilize the position of the image produced by the lens against vibrations such as those that might be caused by movement of the user's hands.

There remains, however, a continuing need for improved OIS suspensions. OIS suspensions of these types that are highly functional, robust and efficient to manufacture would be particularly desirable.

SUMMARY

A suspension assembly is described. A suspension assembly including a support member; a moving member; one or more bearings; and one or more bearing limiters. The one or more bearings between the support member and the moving member to space the support member and moving member by a bearing distance about the z axis. And, the one or more bearing limiters between the first and second members to limit movement of the support member and moving member about the z axis to a gap distance that is less than the bearing distance.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of the invention include optical image stabilization (OIS) suspensions having a static or support member or plate, a moving member or plate, and one or more shape memory alloy (SMA) elements or wires extending between the static and moving plates. An image sensor is mounted to the moving plate. Lens components such as a lens holder and optionally an auto focus (AF) assembly are fixedly mounted to or with respect to the static plate. The SMA wires can be driven by a controller to move the moving plate and image sensor thereon about x-y axes with respect to the static plate and lens components, and stabilize the position of the lens components and the image produced thereby on the sensor. The OIS suspension can thereby compensate for vibrations such as those that might be caused by movement of the user's hands. Suspensions of these types can be miniaturized, and used, for example, with camera lens and imaging systems incorporated into mobile phones, tablets and other devices.

Bearing limiters can be used in OIS suspensions to minimize the amount of bearing compression so that the bearing does not become deformed to significantly affect the focus of an image on an image sensor. If a bearing becomes deformed to significantly affect the focus of an image on an image sensor the image will become blurred. This issue is worse for fixed focus cameras that do not include auto focus that can be used to compensate for a deformed bearing having change in bearing height. The bearing limiters also help maintain the image plane and the image sensor in alignment to remain parallel to each other, for both fixed and auto focus cameras. For example, the alignment of an image plane to an image sensor typically needs to be maintained within plus or minus 0.3 degrees from parallel with respect to each other or better to maintain focus across an entire image. If one or more bearings were to become compressed during a shock event, such as dropping a device in which the suspension assembly is incorporated, this may lead to permanent image blur on the edges of the image because of an angle change between the lens and the image sensor.

Figure 1:
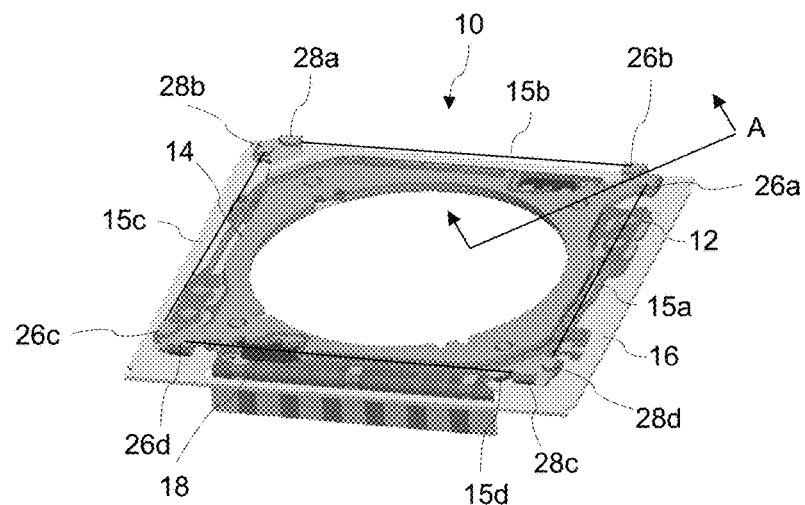
FIG. 1 illustrates a suspension assembly including a bearing limiter according to an embodiment.

FIG. 1 illustrates a suspension assembly 10 including a bearing limiter according to an embodiment. As shown, the suspension assembly 10 includes a flexible printed circuit (FPC) or support member 12 and a spring crimp circuit or moving member 14 that is coupled to the support member 12. The support member 12 is disposed over an optional base 16. Shape memory alloy (SMA) wires 15a-d extend between the support member 12 and the moving member 14, and can be electrically actuated to move and control the position of the moving member with respect to the support member 12. Each of the SMA wires 15a-d are attached to the support member 12 using support member crimps 28a-d and to the moving member using moving member crimps 26a-d. According to other embodiments, the crimps or other SMA wire attach structures are organized in other arrangements, such as a single wire attach structures rather than in pairs. The suspension assembly 10 also includes a shim style bearing limiter 18. The bearing limiter is configured to minimize the amount of bearing compression so that the bearing does not become permanently deformed. The shim style bearing limiter 18 is configured to sit between the support member 12 and the moving member 14. According to various embodiments, a lens can be mounted to the moving member 14. According to other embodiments, an autofocus system supporting the lens can be mounted to the moving member 14. According to various embodiments, the suspension assembly 10 is a camera lens optical image stabilization (OIS) device that can be incorporated, for example, into mobile phones, tablets, laptop computers and other electronic devices.

Figure 2:
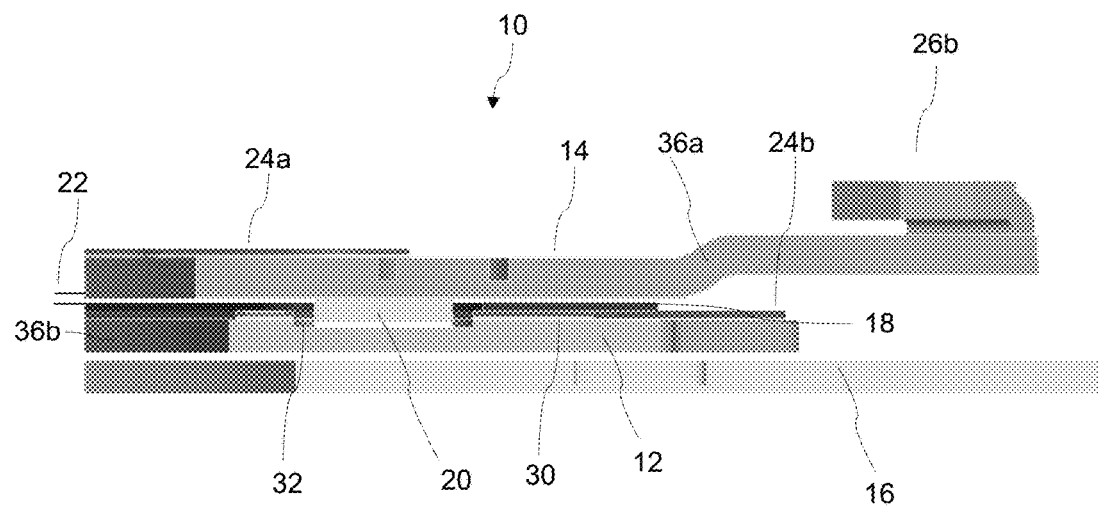
FIG. 2 illustrates a cross-section of the suspension assembly as illustrated in FIG. 1 taken along line A.

FIG. 2 illustrates a cross-section of the suspension assembly as illustrated in FIG. 1 taken along line A. The shim style bearing limiter 18 is positioned between the moving member 14 and the support member 12. The shim style bearing limiter 18 is configured to minimize the amount a bearing 20 can be compressed by the moving member 14 before the moving member 14 hits the shim style bearing 18. The height of the bearing 20 defines a bearing distance about a z-axis of the suspension assembly. For some embodiments, a gap 22 (also referred to herein as gap distance) can exist between the moving member 14 and the shim style bearing limiter 18. The gap 22 can enable the moving member 14 to move in the direction of the longitudinal axis, for example in the direction of an x axis and y axis, of the moving member 14. For various embodiments, the gap 22 is configured to be no more than 20 percent of the original height of a bearing 20. For some embodiments, the gap 22 can be in a range including 20-25 microns. The thickness of the shim style bearing limiter 18, according to some embodiments, is configured to allow a bearing 20 to protrude over the shim style bearing limiter by a height in a range of approximately 10-35 microns above the shim style bearing limiter 18 when disposed on the support member 12.

The support member 12, for some embodiments, includes a dielectric layer 24 disposed over at least a portion of the support member 12. The dielectric layer 24b can be a cover coat disposed over a conductive layer 30. For various embodiments, the dielectric layer 24 is a polyimide layer. The conductive layer 30 includes one or more traces and is disposed over the support member 12. The support member 12, according to some embodiments, includes a partial etch pocket 32. The partial etch pocket 32 is configured to a location on a support member 12 for the bearing 20. The depth of the partial etch pocket 32 can be adjusted to provide a desired gap 22 while reducing the thickness of a bearing limiter, such as a shim style bearing limiter 18. In some cases, adjusting the depth of the partial etch pocket 32 can be more cost effective and/or convenient than increasing or decreasing material thickness of a bearing limiter. Other embodiments include a support member without a partial etch pocket 32 formed in the support member 12. Such embodiments may include a thicker shim style bearing limiter 18 instead.

Both the base member 12 and the moving member 14 are integrated lead structures according to the some embodiments, in that they have electrical structures such as leads, contact pads and terminals (e.g. in a copper "Cu" or copper alloy layer) formed on a metal base layer 36a,b (e.g. stainless steel (SST)). The dielectric layers 24a,b separates the portions of the electrical structures that are to be electrically isolated from the metal base layers 36a,b (for various embodiments, other portions of the Cu layer are connected to or directly on a metal base layer 36a,b).

Figure 3:
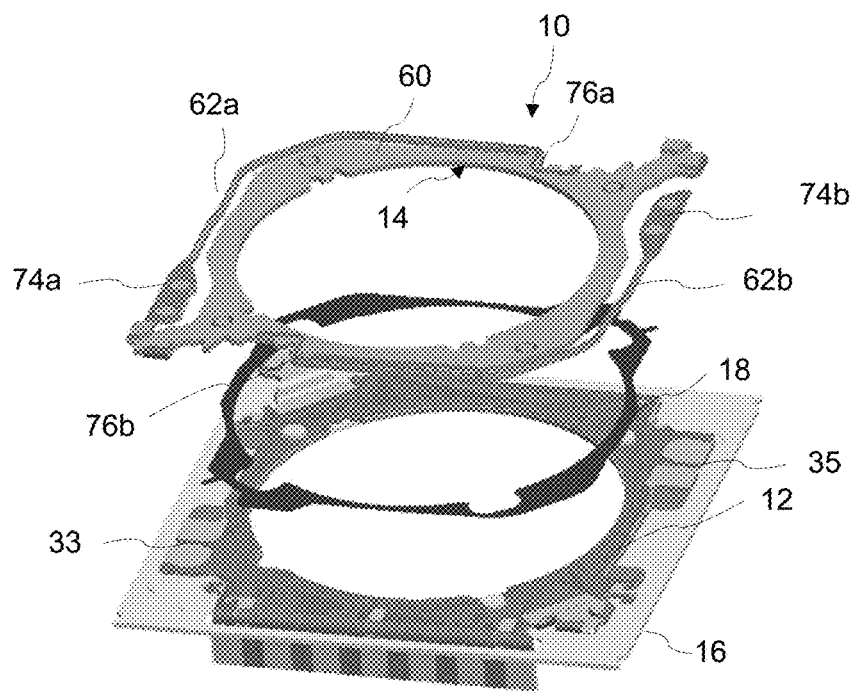
FIG. 3 illustrates an exploded view of the suspension assembly illustrated in FIG. 1.

FIG. 3 illustrates an exploded view of the suspension assembly illustrated in FIG. 1. The shim style bearing limiter 18 is between the support member 12 and the moving member 14. As shown, the moving member 14 includes a plate 60 and spring or flexure arms 62a,b extending from the plate 60. The plate 60, for some embodiments, includes a sensor mounting region configured to receive an image sensor. According to various embodiments, the plate 60 and flexure arms 62a,b are formed in a spring metal base layer such as stainless steel. Moving member 14 is configured differently in other embodiments. For example, in other embodiments, the flexure arms 62a,b can be shaped differently, be different in number, organized differently, and/or can extend from other locations on the plate 60.

The end portions of the flexure arms 62a,b have mount regions 74a,b that are configured to be mounted to the mount regions 33 and 35 of the support member 12. Conductive traces 76a,b on the base layer 36a of the moving member 14 extend on the flexure arms 62a,b. According to various embodiments, the traces 76a,b also extend on the base layer 36a over portions of the plate 60. According to the illustrated embodiment, the traces 76a,b on the arms 72 also extend to contact pads on the plate 60. A layer of dielectric is located between the conductive traces 76s,b and the base layer 36a,b to electrically insulate the traces 76a,b from the base layer 36a,b.

The mount regions 74a,b of the moving member flexure arms 62a,b are mechanically attached to the mount regions 33 and 35 respectively of the support member 12. The traces 76a,b on the flexure arms 62a,b are electrically connected to the associated traces on the support member 12. According to various embodiments, the mechanical connections are made by welds. The welds also enable electrical connections between the moving member 14 and the support member 12 that can be used to actuate the moving member 14 using SMA wires 15a-c. Other embodiments have other structures for mechanically mounting the flexure arms 62a,b to the support member 12, and/or for electrically connecting the traces 76a,b on the flexure arms to the associated traces on the support member 12.

The support member 12 and moving member 14 can be formed from additive and/or subtractive processes using techniques including those known in the art. Base layers 36a,b are stainless steel according to various embodiments. For other embodiments the base layers 36a,b are other metals or materials such as phosphor-bronze. Traces, terminals, and contact pads can be formed from copper, copper alloys or other conductive materials. Polyimide or other insulating materials can be used as a dielectric.

Figure 4:
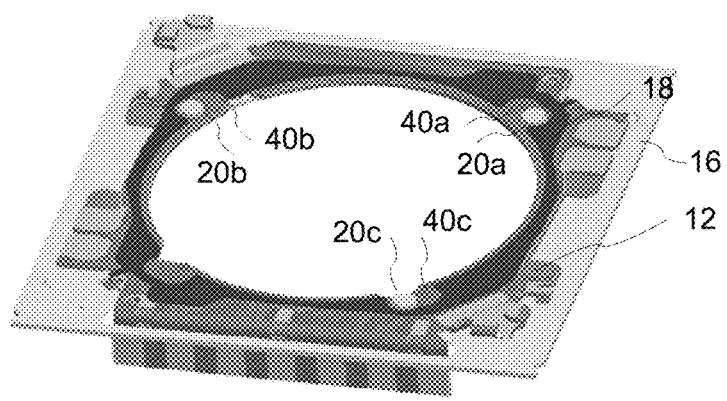
FIG. 4 illustrates a moving member of a suspension assembly including a shim style bearing limiter as illustrated in FIG. 1.

FIG. 4 illustrates a moving member of a suspension assembly including a shim style bearing limiter as illustrated in FIG. 1. The shim style bearing limiter 18 is disposed on the support member 12, which is disposed on base 16. The shim style bearing limiter 18 forms voids 40a-d. The voids 40a-d are formed so that bearings 20a-c are within the voids 40a-d. As illustrated, the support member 12, according to some embodiments, also includes three bearings 20a-c formed as slide bearings. However, any number of bearings 20a-c may be used. The bearings 20a-c formed as slide bearings can be made from or include a low friction material to enable relative sliding between the moving member 14 and the support member 12. For some embodiments, the bearings 20a-c are ball bearings with features formed on support member 12 to contain the ball bearings. The shim style bearing limiter 18, according to various embodiments, is configured to not be too high and rub on the moving member 14. Other embodiments, include a shim style bearing limiter that is formed of separate sections instead of a unitary form. Each shim style bearing limiter section is configured to mount on the support member 12 adjacent to each of the one or more bearings 20a-c.

Figure 5:
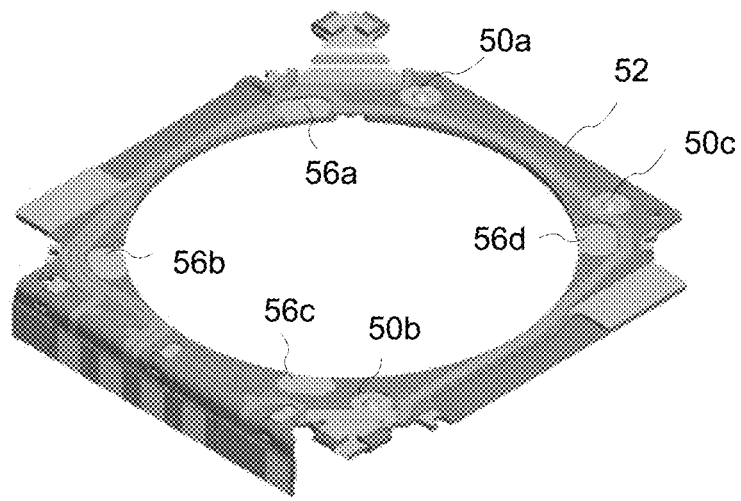
FIG. 5 illustrates a support member of a suspension assembly according to an embodiment.
Figure 6:
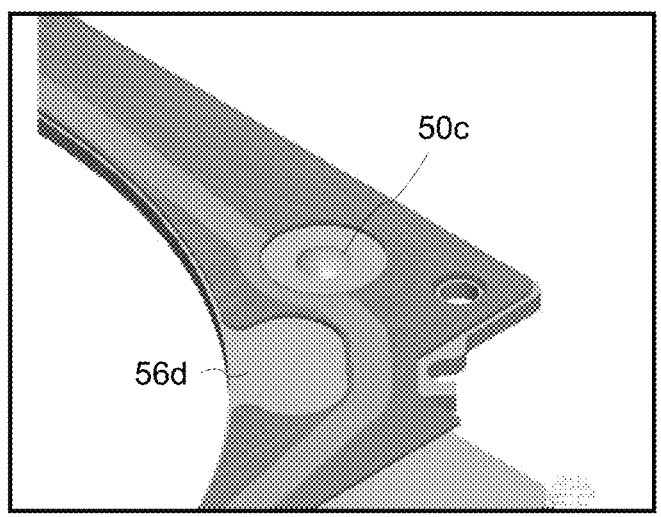
FIG. 6 illustrates a more detailed view of a formed feature bearing limiter according to an embodiment formed adjacent a bearing location of a support member.

FIG. 5 illustrates a support member of a suspension assembly according to an embodiment. Support member 52 includes formed feature bearing limiters 50a-c in the form of a dimple. The formed feature bearing limiters 50a-c are formed near one or more of bearing locations 56a-c. As described herein, the height of the bearing limiters are configured to minimize the amount of bearing compression so that the bearing disposed on bearing locations 56a-d do not become permanently deformed. For various embodiments, the height of the formed feature bearing limiters 50a-c is in a range including approximately 15-25 microns shorter than the height of a bearing. However, one will understand that other heights of a formed feature bearing limiter can be used. For some embodiments, the number of formed feature bearing limiters 50a-c used is equal to the number of bearings used on a support member 52. For other embodiments, the number of formed feature bearing limiters 50a-c used can be more or less than the number of bearings used on a support member 52. FIG. 6 illustrates a more detailed view of a formed feature bearing limiter 50c formed adjacent a bearing location 56d of a support member 52.

Figure 7A:
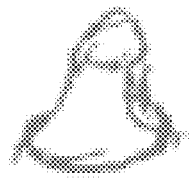
FIGS. 7a-d illustrate formed feature bearing limiters according to various embodiments.
Figure 7B:
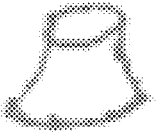
Figure 7C:
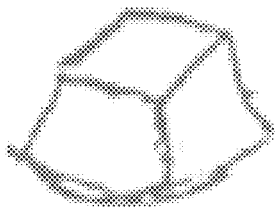
Figure 7D:
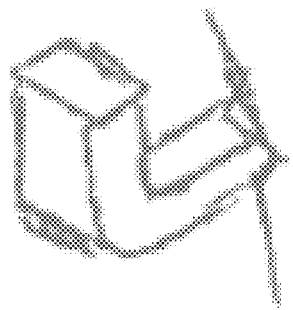

FIGS. 7a-d illustrate formed feature bearing limiters according to various embodiments. FIG. 7a illustrates a formed feature bearing limiter formed in the shape of a first shape flat top tower. FIG. 7b illustrates a formed feature bearing limiter formed in the shape of a second shape flat top tower. FIG. 7c illustrates a formed feature bearing limiter formed in the shape of a third shape flat top tower. FIG. 7c illustrates a formed feature bearing limiter formed in the shape of a 90 degree formed finger. Thus, one would understand that formed feature bearing limiters can be formed of many different shapes. And, more than one shape can be used on a support member at the same time.

The formed feature bearing limiters can be formed in the metal base layer by shaping the metal base layer using techniques including those known in the art. The formed feature bearing limiters can also be formed using dielectric materials disposed on a support member or a moving member in a shape as desired using techniques for depositing and etching dielectric materials using techniques including those known in the art. Further, various embodiments include forming formed feature bearing limiters using conductive material formed on a support member or a moving member using depositing and etching techniques including those known in the art. For other embodiments, the formed feature bearing limiters can be manufactured separately from a support member or a moving member and attached to a support member or a moving member. The formed feature bearing limiters can be attached to a support member or to a moving member by welding, solder, adhesive, and other techniques including those known in the art.

Figure 8:
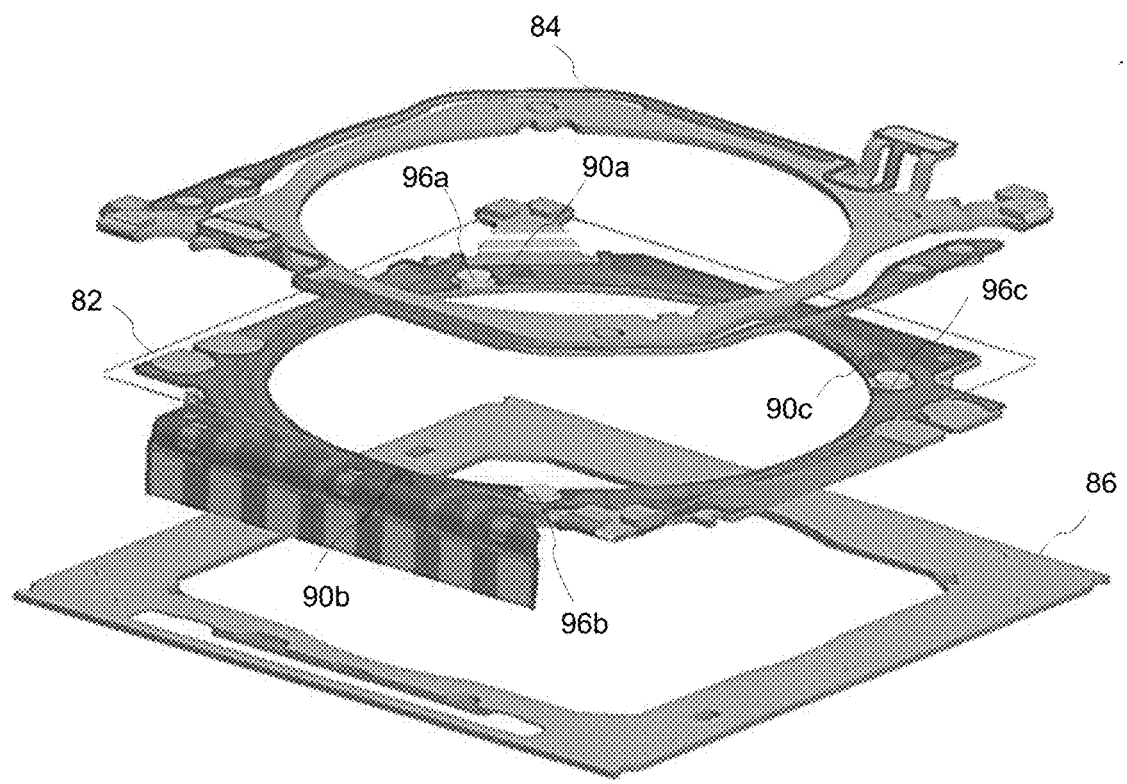
FIG. 8 illustrates a suspension assembly including an adhesive bearing limiter according to an embodiment.

FIG. 8 illustrates a suspension assembly including an adhesive bearing limiter according to an embodiment. As shown, the suspension assembly 10 includes a moving member 84, and an optional base 86 similar to those described herein. The moving member 84 disposed on a support member 82. The support member 82, according to embodiments is disposed on an optional base 86. The support member 82 includes adhesive bearing limiters 90a-c formed near one or more of bearings 96a-c. As described herein, the height of the bearing limiters are configured to minimize the amount of bearing compression so that the bearings 96a-d do not become permanently deformed. For various embodiments, the height of the adhesive bearing limiters 90a-c is in a range including approximately 15-25 microns shorter than the height of a bearing. However, one will understand that other heights of an adhesive bearing limiter can be used. For some embodiments, the number of adhesive bearing limiters 90a-c used is equal to the number of bearings used on a support member 82. For other embodiments, the number of adhesive bearing limiters 90a-c used can be more or less than the number of bearings used on a support member 82. For other embodiments, adhesive bearing limiters can be put in many locations around support member 82 in many different quantities. For some embodiments, one or more adhesive bearing limiters are attached to a moving member instead of a support member.

Figure 9:
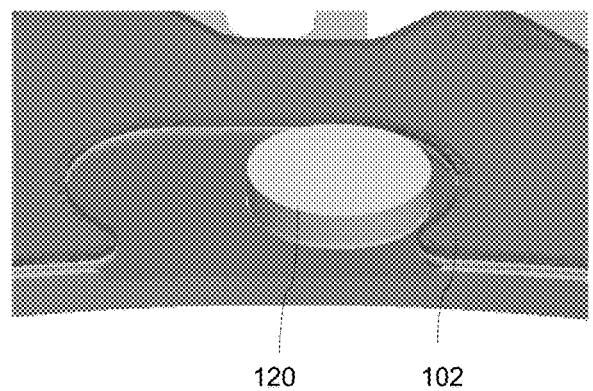
FIG. 9 illustrates a support member of a suspension assembly including a dielectric and metal bearing limiter according to an embodiment.

FIG. 9 illustrates a support member of a suspension assembly including a dielectric and metal bearing limiter according to an embodiment. The dielectric and copper bearing limiter 102 is formed adjacent to a bearing 120. As described herein, the height of the bearing limiters are configured to minimize the amount of bearing compression so that the bearing 120 does not become permanently deformed.

Figure 10:
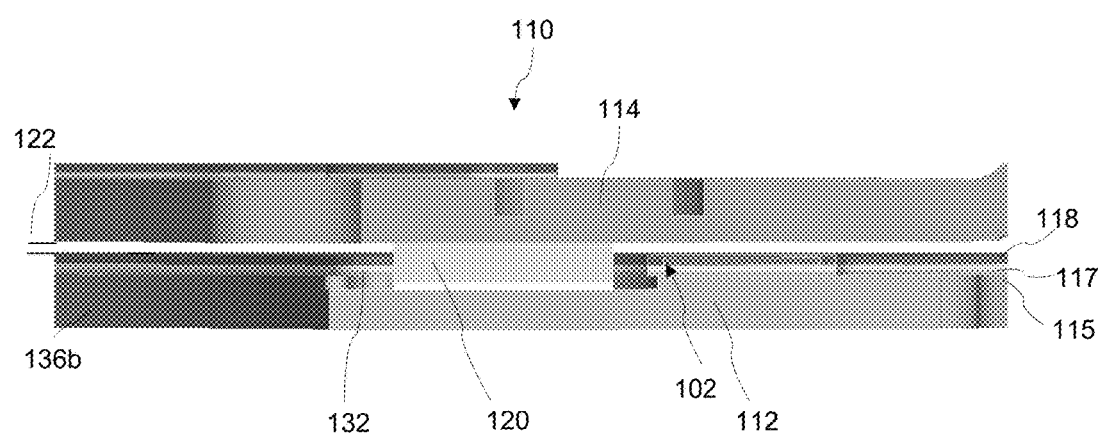
FIG. 10 illustrates a cross section of a suspension assembly including a dielectric and metal bearing limiter according to an embodiment.

FIG. 10 illustrates a cross section of a suspension assembly including a dielectric and metal bearing limiter 102 according to an embodiment. The dielectric and metal bearing limiter 102 is formed of a first dielectric layer 118 (also referred to as a cover layer) disposed over a metal layer 117, which is disposed over a second dielectric layer 115 formed on a metal base layer 136b of the support member 112. For such embodiments, The first dielectric layer 118, the metal layer 117, and the second dielectric layer 115 are formed near a bearing 120 to have a thickness to minimize the amount the bearing 120 can be compressed by a moving member 114. For some embodiments, the first dielectric layer 118 and second dielectric layer 115 are formed from polyimide. However, the first dielectric layer 118 and the second dielectric layer 115 can be formed of other insulating materials. The metal layer 117 according to some embodiments is formed from copper. However, the metal layer 117 can be formed of other conductive materials.

The dielectric and metal bearing limiter 102 is configured to minimize the amount a bearing 120 can be compressed by the moving member 114 before the moving member 114 hits the dielectric and metal bearing 102. For some embodiments, a gap 122 can exist between the moving member 114 and the dielectric and metal bearing limiter 112. The gap 122 can enable the moving member 114 to move in the direction of the longitudinal axis, for example in the direction of an x axis and y axis, of the moving member 114. For various embodiments, the gap 122 is configured to be no more than 20 percent of the original height of a bearing 120. For some embodiments, the gap 122 can be in a range including 20-25 microns. The thickness of the dielectric and metal bearing limiter 112, according to some embodiments, is configured to allow a bearing 120 to protrude over the dielectric and metal bearing limiter 120 by a height in a range of approximately 10-35 microns above the dielectric and metal bearing limiter 112 when disposed on the support member 112.

The metal layer 117 includes one or more traces, according to some embodiments, and is disposed over the support member 112. The support member 112, according to some embodiments, includes a partial etch pocket 132. The partial etch pocket 132 is configured as a location on a support member 112 for the bearing 120. Other embodiments include a support member without a partial etch pocket 132 formed in the support member 112.

Although the invention has been described with reference to different embodiments, those of skill in the art will recognize that changes can be made in form and detail without departing from the spirit and scope of the invention. Features of the different illustrated embodiments can be combined with one another. The specification and drawings are, accordingly, to be regarded in an illustrative rather than a restrictive sense.

What is claimed is:

1. A suspension assembly, comprising:
   a support member;
   a moving member;
   one or more bearings between the support member and the moving member to space the support member and moving member by a bearing distance about the z axis; and
   one or more bearing limiters between the first and second members to limit movement of the support member and moving member about the z axis to a gap distance that is less than the bearing distance.

2. The suspension assembly of claim 1 wherein the gap distance is small enough to substantially reduce damage to the bearings or other structures due to external forces on the suspension assembly.

3. The suspension assembly of claim 1 wherein each bearing limiter is a shim style bearing limiter.

4. The suspension assembly of claim 1 wherein at least one of the one or more bearing limiters is in the form of a dimple.

5. The suspension assembly of claim 1 wherein at least one of the one or more bearing limiters is one or more is formed in the shape of a flat top tower.

6. The suspension assembly of claim 1 wherein at least one of the one or more bearing limiters is one or more is formed in the shape of a 90 degree formed finger.

7. The suspension assembly of claim 1 wherein each bearing limiter is attached to one of the support member or the moving member.

8. The suspension assembly of claim 1 wherein the gap distance is between about 10-35 microns.

9. The suspension assembly of claim 1 wherein at least one of the one or more bearing limiters is an adhesive bearing limiter.

10. The suspension assembly of claim 1 wherein at least one of the one or more bearing limiter is one or more is formed from a dielectric layer and a metal layer.

11. The first member of claim 1 wherein at least one of the one or more bearing limiters is one or more is formed in the shape of a 90 degree formed finger.

12. The first member of claim 1 wherein the first member is a support member.

13. The first member of claim 1 wherein the first member is a moving member.

14. The first member of claim 1 wherein at least one of the one or more bearing limiters is an adhesive bearing limiter.

15. The first member of claim 1 wherein at least one of the one or more bearing limiter is one or more is formed from a dielectric layer and a metal layer.

16. A first member of a suspension assembly comprising:
   one or more bearings having a height, the one or more bearings configured to define a bearing distance between a second member of the suspension assembly; and
   one or more bearing limiters attached to the first member, the one or more bearing limiters configured to minimize an amount of bearing compression of the one or more bearings.

17. The first member of claim 16 wherein each bearing limiter is a shim style bearing limiter.

18. The suspension assembly of claim 16 wherein at least one of the one or more bearing limiters is in the form of a dimple.

19. The first member of claim 16 wherein at least one of the one or more bearing limiters is one or more is formed in the shape of a flat top tower.

* * * * *